United States Patent
Rácz et al.

(10) Patent No.: US 11,277,807 B2
(45) Date of Patent: Mar. 15, 2022

(54) METHOD AND ARRANGEMENT FOR DETERMINISTIC DELIVERY OF DATA TRAFFIC OVER WIRELESS CONNECTION

(71) Applicant: Telefonaktiebolaget LM Ericsson (publ), Stockholm (SE)

(72) Inventors: Sándor Rácz, Cegléd (HU); Norbert Reider, Tényö (HU); Geza Szabo, Kecskemet (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/954,231

(22) PCT Filed: Jan. 11, 2018

(86) PCT No.: PCT/EP2018/050648
§ 371 (c)(1),
(2) Date: Jun. 16, 2020

(87) PCT Pub. No.: WO2019/137609
PCT Pub. Date: Jul. 18, 2019

(65) Prior Publication Data
US 2020/0322909 A1 Oct. 8, 2020

(51) Int. Cl.
*H04W 56/00* (2009.01)
*H04L 43/028* (2022.01)
(Continued)

(52) U.S. Cl.
CPC ......... *H04W 56/004* (2013.01); *H04L 43/028* (2013.01); *H04L 43/0852* (2013.01); *H04L 43/106* (2013.01); *H04L 49/90* (2013.01)

(58) Field of Classification Search
None
See application file for complete search history.

(56) References Cited

U.S. PATENT DOCUMENTS 6,360,271 B1   3/2002   Schuster et al.
7,170,856 B1   1/2007   Ho et al.
(Continued)

OTHER PUBLICATIONS

Lam, E. et al., "Programmable Orchestration of Time-Synchronized Events Across Decentralized Android Ensembles", 2015 IEEE 11th International Conference on Wireless and Mobile Computing, Networking and Communications (WiMob), Oct. 19, 2015, pp. 659-666, IEEE.
(Continued)

*Primary Examiner* — Anh Ngoc M Nguyen
(74) *Attorney, Agent, or Firm* — Coats + Bennett, PLLC

(57) ABSTRACT

The present disclosure relates to delivery of data traffic over a wireless connection. In more particular, it relates to methods, a tunneling unit (208), and system for emulating wired connectivity between two or more robot devices (202, 204) and a controller (222). Buffering (212) of data frames, from two or more robot devices, received up-streams a wireless access network (206) is performed. Based on the time-stamps extracted (210) from data frames a relative time offset is determined for the two or more robot devices. Buffered uplink frames are forwarded (216) to the controller in a pre-define order, enabling using the relative time offset when forwarding downlink frames (232), being received over the wireless access network (206), to said two or more robot devices, such the that the downlink frames reach each one of two or more robot devices simultaneously. A deterministic delivery of data frames over a wireless connection is provided.

18 Claims, 4 Drawing Sheets

(51) Int. Cl.
*H04L 43/0852* (2022.01)
*H04L 43/106* (2022.01)
*H04L 49/90* (2022.01)

(56) References Cited

U.S. PATENT DOCUMENTS

| | | | | |
|---|---|---|---|---|
| 7,447,931 | B1* | 11/2008 | Rischar | H04J 3/0697 |
| | | | | 368/46 |
| 9,623,562 | B1* | 4/2017 | Watts | B25J 9/1689 |
| 2016/0302166 | A1 | 10/2016 | Dang et al. | |
| 2018/0165947 | A1* | 6/2018 | Wang | G08C 17/02 |
| 2018/0288785 | A1* | 10/2018 | Guo | H04W 28/16 |

OTHER PUBLICATIONS

International Electrotechnical Commission, "Industrial Networks—Wireless Communication Network and Communication Profiles—WirelessHART(TM)", Mar. 30, 2016, IEC 62591:2016, pp. 464, IEC.

* cited by examiner

METHOD AND ARRANGEMENT FOR DETERMINISTIC DELIVERY OF DATA TRAFFIC OVER WIRELESS CONNECTION

TECHNICAL FIELD

This disclosure relates to delivery of data traffic over wireless connection. In more particular, it relates to a method and an arrangement for emulating wired connectivity between two or more robot devices and a controller.

BACKGROUND

Moving robotics and automation algorithms into the cloud requires frameworks that facilitate this transition. The cloud provides three possible levels at which a framework could be implemented. The lowest level is Infrastructure as a Service (IaaS), where bare operating systems are provided on machines, which can be virtualized, in the cloud. The second level, Platform as a Service (PaaS), provides more structure, including application frameworks and database access, while restricting the choice of programming languages, system architectures, and database models, which can be used. Software as a Service (SaaS), the third level is the highest level of structure of which there is a demand these days.

The current focus of cloud based robotics is to either speed up the processing of input data collected from many sensors with big data computation, or to collect various knowledge bases in centralized locations e.g., possible grasping poses of various three-dimensional (3D) objects.

Current industrial robot deployments consist of a robotic arm and a controller thereof localized very close to it. The controller typically has predefined commands, which have to be executed. The controller and the arm are typically connected via proprietary industrial protocols.

In general, control of robot cells requires deterministic transmission of commands and data with low transmission delay. One example of such transmission is Process field Network (ProfiNet) over wired access. According to another example, this is targeted by time sensitive networks, which also work over wired access.

Radio connection introduces delay and jitter in transmissions and this delay and jitter has been found to be very difficult to eliminate totally in transmission systems. Radio connection has typically retransmission mechanisms at different layers, for example, Hybrid automatic repeat request (HARQ), and Radio link control—acknowledged mode (RLC AM), which are responsible for said delay and jitter.

In order to mitigate the negative impact of delay and/or jitter on robot control using wireless connection, as compared to wired connection, tailor-made solutions considering also the type of robot control task, may be needed.

Prior art techniques focus only on general aspects of industrial protocols when they are carried over wireless connections. A common technique is to increase the update time of the industrial protocol used, for instance ProfiNet, such that it is longer than the delay introduced by a wireless connection.

Document U.S. Pat. No. 6,360,271 B1 describes a system for dynamic jitter buffer management based on synchronized clocks. The system for dynamically jitter buffering a sequence of packets, is based on substantially synchronized time signals maintained at the transmitting and receiving ends of a communication system. The time signals may be synchronized, for instance, by equipping both the transmitting and receiving ends with global positioning system receivers. The transmitting end may mark each outgoing packet with a sender-time based on the time signal at the transmitting end. Dynamic jitter buffering may then be provided by scheduling delayed play-out of each packet. For instance, the jitter buffer at the receiving end may be configured to delay play-out of each packet until the time signal at the receiving end indicates a time that is substantially a predetermined end-to-end delay period after the sender-time for the packet.

Document U.S. Pat. No. 7,170,856 B1 describes a jitter buffer for a circuit emulation service over an Internet protocol network. The jitter buffer receives a plurality of data packets comprising a circuit emulation service over internet protocol, buffers the plurality of data packets, and plays data from the plurality of data packets at a constant bit rate corresponding to the circuit emulation service over Internet protocol.

None of the reviewed prior-art work proposes a solution where special requirements of typical state-of-the-art industrial protocols are taken into account when they are used over a wireless link.

There is a demand for a technique with which wireless connection can be successfully used in the control of robot devices.

SUMMARY

It is an object of embodiments of the disclosure to address at least some of the issues outlined above, and this object and others are solved by a tunneling unit, a system and a method performed therein, a computer program and a computer-readable storage medium for emulating wired connectivity between two or more robot devices and a robot controller.

According to an aspect, thee present disclosure provides a method of emulating wired connectivity between two or more robot devices and a controller. The method is performed in a tunneling unit located up-streams of a wireless access network and down-streams of a controller. The method comprises receiving, over the wireless access network, uplink frames from each one of said two or more robot devices. The method also comprises providing a time stamp of the uplink frames received from each one of said two or more robot devices. Also, the method comprises buffering the uplink frames. The method further comprises determining, for each one of said two or more robot devices, a relative time offset, based on the provided time stamps for said two or more robot devices. In addition, the method comprises forwarding the buffered uplink frames towards the controller in a pre-defined order, enabling using the relative time offset when forwarding downlink frames, when received over the wireless access network, to said two or more robot devices, such the that the downlink frames reach each one of two or more robot devices simultaneously.

According to another aspect, the disclosure provides a tunneling unit that is operative to emulate wired connectivity between two or more robot devices and a controller. The tunneling unit is adapted to be located up-streams of wireless access network and down-streams of a controller. The tunneling unit comprises a packet inspecting module that is adapted to receive, over the wireless access network, uplink frames from each one of said two or more robot devices. The packet inspection module is also adapted to provide a time stamp of the uplink frames received from each one of said two or more robot devices. The tunneling unit also comprises a buffering module that is adapted to buffer the uplink frames. The tunneling unit also comprises a determining device offset module that is adapted to determine for each one of said two or more robot devices, a relative time offset, based on the provided time stamps for said two or more robot devices. In addition, the tunneling unit comprises an uplink forwarding module that is adapted to forward the buffered uplink frames towards the controller in a pre-defined order, enabling a further tunneling unit to forward downlink frames using the relative time offset, to said two or more robot devices, such the that the downlink frames reach each one of two or more robot devices simultaneously.

According to yet another aspect, the disclosure provides a tunneling unit that is operative to emulate wired connectivity between two or more robot devices and a controller. The tunneling unit is adapted to be located up-streams of wireless access network and down-streams of a controller. The tunneling unit comprises a processor circuit, and a memory, where the memory has instructions executable by the processor circuit, wherein said processor circuit when executing said instructions is configured to: Receive, over the wireless access network, uplink frames from each one of said two or more robot devices. Provide a time stamp of the uplink frames received from each one of said two or more robot devices. Buffer the uplink frames, Determine, for each one of said two or more robot devices, a relative time offset, based on the provided time stamps for said two or more robot devices. The processor circuit when executing said instructions is also configured to forward the buffered uplink frames towards the controller in a pre-defined order, enabling another tunneling unit to forward downlink frames using the relative time offset, to said two or more robot devices, such the that the downlink frames reach each one of two or more robot devices simultaneously.

According to yet another aspect, the disclosure provides a system that is operative to emulate wired connectivity between two or more robot devices and a controller. The system comprising a tunneling unit, as above, and that is adapted to be located up-streams of a wireless access network and down-streams of a controller. The system comprises a further tunneling unit that is adapted to be located down-streams of the wireless access network and up-streams of the two or more robot devices. The further tunneling unit comprises a buffering module that is adapted to receive, over the wireless access network, downlink frames to be forwarded to said two or more robot devices. The buffering module is also adapted to buffer the downlink frames, a time period that is specific to each one of said two or more robot devices, where the time period is at least based on the relative time offset determined for each one of said two or more robot devices. The further tunneling unit also comprises a downlink forwarding module that is adapted to forward the buffered downlink frames to said two or more robot devices, such that the buffered downlink frames arrive at each one of said two or more robot devices simultaneously.

According to yet another aspect, the disclosure provides a computer program for emulating wired connectivity between two or more robot devices and a controller. The computer program comprises instructions which, when executed on at least one processor, cause the at least one processor to carry out the method according to aspects as described above.

According to yet another aspect, the disclosure provides a computer-readable storage medium, having thereon said computer program.

One or more of the following advantages are provided by embodiments of the present disclosure.

A cost effective and efficient technology is hence provided for the transition from wired to wireless technologies in industry environments. This is certainly an advantage.

It is advantageous that existing legacy protocols and industry devices, such as robot devices, can remain unchanged. There is thus no need for replacing the devices.

It is also an advantage that data frame transmission is more deterministic in uplink and downlink directions.

This disclosure has further the advantage that data frames of sensors, measuring units, or the like, can be delivered to a controller in a pre-defined, and hence deterministic, order.

In addition, it is advantageous that a more deterministic transport service is provided for automation application in industry.

BRIEF DESCRIPTION OF THE DRAWINGS

Embodiments will now be described in more detail, and with reference to the accompanying drawings, in which.

DETAILED DESCRIPTION

Figure 1:
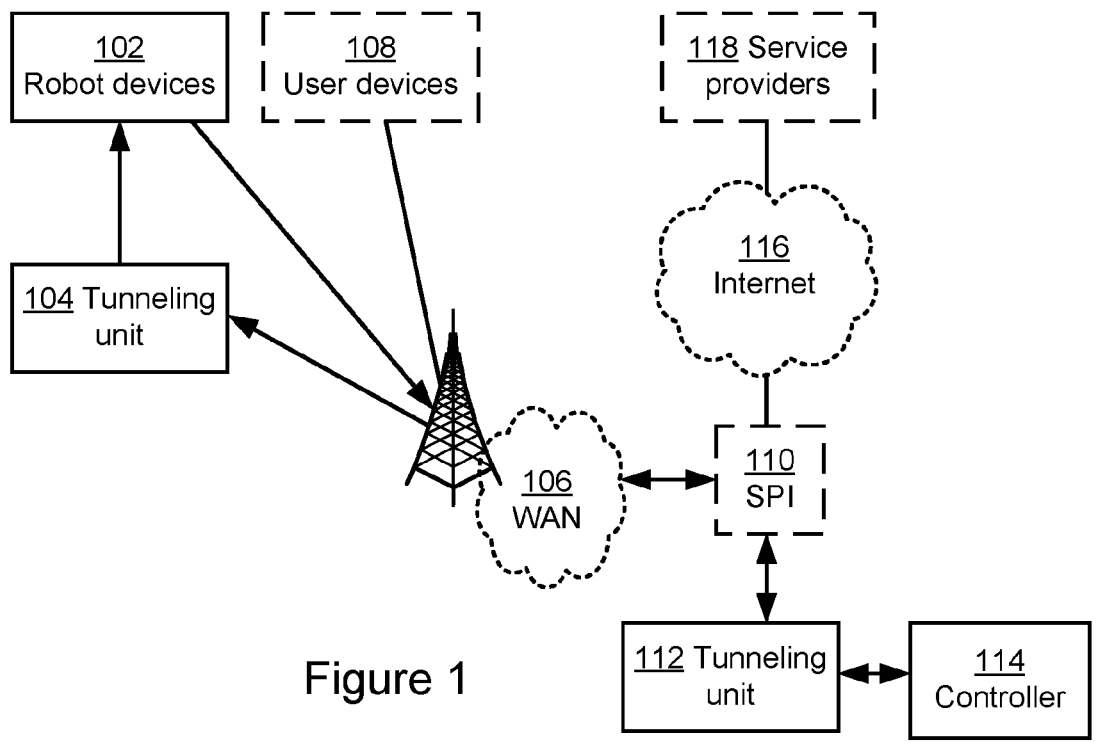
FIG. 1 illustrates an architecture that is related to embodiments of the present disclosure.

In the following description, different embodiments of the disclosure will be described in more detail, with reference to accompanying drawings. For the purpose of explanation and not limitation, specific details are set forth, such as particular examples and techniques in order to provide a thorough understanding.

As mentioned above, prior art techniques focus only on general aspects of industrial protocols when they are carried over wireless connections. Still, state-of-the-art techniques typically use wired connections when communicating different industry protocols, such as the process field network (ProfiNet).

It can be mentioned that controlling of robots from the cloud is currently not feasible in the robotics industry due to many reasons, some of which being the lack of trustworthy low delayed wireless/wired link and strategic deterministic decisions.

It would be advantageous with a technique with which wireless connection can be successfully used with existing legacy industry protocols and for the control of existing robot devices, without the need to replace any of them. In order to achieve this, a seamless transition from wired to wireless communication technologies may have to be used. There is there also desired to introduce a technique to emulate characteristics of wired technologies when using wireless technologies.

In order to mitigate the impact of delay and/or jitter on robot control using wireless connection as compared to wired connection, tailor-made solutions considering also the type of robot control task, may also be needed. Different robot control tasks may require different transport characteristics: (i) motion control requires very low delay, but is less sensitive for packet loss (ii) coordination of several sensors and/or actuators may require deterministic and/or synchronized transmission of sensor and/or actuator data, where fixed delay may be compensated for, by controller logic.

According to the present disclosure a technology is provided taking into account special requirements of state-of-the-art industrial protocols when used over a wireless link, such as synchronized delivery of packets among multiple robot devices and a controller, according to update time of the protocol, and handling of missing, or out-of-order, packets. Thus, delivery of industrial protocol will be deterministic using the present disclosure.

Previous techniques can provide communication services between industry devices and control centers with the usage of different wired industry communication protocols such as ProfiNet or time-sensitive networking (TSN).

To emulate the functionality of the robot cell using wired technologies when in fact using wireless connections, new means have been introduced. In this disclosure, it is proposed methods enabling running the same robot cell with the same equipment, as where used in wired connection, over a wireless network.

Components and elements comprised in an industry system usually have to meet some communication requirements towards underlying communication infrastructure, which requirements are easily fulfilled in case the communication is based on wired technology only.

However, when radio technology is being used, there is a need for new functionalities to ensure the same operation, at least overall, of the system as compared to when using wired technology.

These functionalities may require for example, cross-layer and measurement based parameter tuning of robotics systems to ensure an expected, or legacy, behavior of the devices as comprised in the robotics systems.

Thus, the present disclosure is addressed to emulating the behavior of legacy systems implying that devices used in wired environments, can still be used in these wireless environments without having to be replaced. A further aspect of the present disclosure may be regarded to ensure that a transition from wired communication to wireless communication can be performed in an efficient and cost effective manner, for example, where legacy protocols and devices are successfully left unchanged.

In case a prior art ProfiNet-based communication is applied for robot devices, two time parameters are important for the effect the operation using ProfiNet. One parameter of the two, is called ProfiNet update time that determines the per packet inter-arrival time, that is, the time between consecutive ProfiNet frames. The other parameter is called ProfiNet retry that expresses the number of tolerated update time periods. This means that if the delay between two consecutive ProfiNet frames exceeds update time x retry time, then the ProfiNet notices a communication error and initiates an emergency stop of a complete robot cell immediately.

In prior-art technologies, there is, for instance every 2 milliseconds (ms) precisely, an Ethernet-based packet transmitted over the wired connection, between robot cell devices and hardware programmable logic controller (PLC). Since the delay and jitter are negligible in transmission over unshielded twisted pair (UTP) cables within a robot cell, within a size of few square meters, using Ethernet-based ProfiNet frames, the transmitted frames arrive precisely at every 2 ms at a receiver.

However, in the case of wireless connection, this is not the case, since wireless naturally introduces some fix delay in packet transmission. Moreover, it may also introduce random jitter, which is a delay variance, at an arrival end of consecutive packets if retransmission of a radio frame is performed over the radio link. The retransmission on radio is typically handled by hybrid automatic repeat request (HARQ) protocol in a $4^{th}$ or $5^{th}$ generation wireless systems (4G or 5G) network, which protocol can initiate the retransmission of a lost radio frame by the transmitter if it receives a negative acknowledgement from the receiver. Hence both jitter as well delay will have to be handled by the present disclosure.

FIG. 1 illustrates an architecture that is related to embodiments of the present disclosure. It is herein proposed a functionality to deliver industrial protocol messages from robot devices 102 over a wireless access network (WAN) 106 to a controller 114. The proposed functionality has uplink as well as downlink components in the form of a tunneling unit 112 and further tunneling unit 104, localized at respective end of a wireless connection. The wireless connection that can be established between said tunneling unit 112 and said further tunneling unit 104 may be regarded to be a wireless tunnel. It is pointed out that said tunneling unit 112 is passed by the protocol communications in both the uplink as well as the downlink. The further tunneling unit 104 is passed by protocol communications in the downlink only, and thus not in the uplink.

When deployed for instance in industry environments, the may be established wireless connections for user devices 108 also. Using different traffic types of wireless communication, these different traffic types are usually separated at an aggregation point of a wireless system, for instance, a shallow packet inspection (SPI) module 110 located for instance in a 5G edge cloud.

Whereas robot device data will be separated from user data, when present, in SPI 110, only robot device data will reach said tunneling unit 112 and the controller 114. User data may then be forwarded via the Internet 116 to, for instance, service providers 118.

As will be described in detail down below, said tunneling units 104, 112 comprise time-alignment functionality, for which reason said tunneling units may also be regarded to be time-aligned tunneling units.

Figure 2:
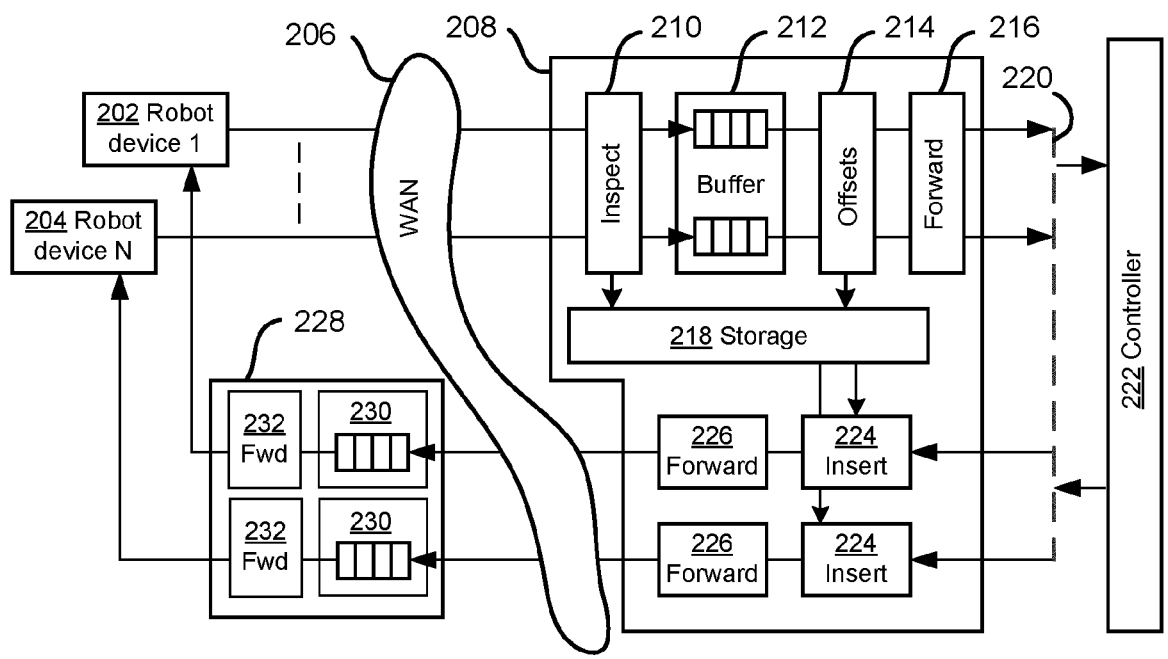
FIG. 2 schematically presents an embodiment of a system according to the present disclosure.

FIG. 2 schematically presents an embodiment of a system according to the present disclosure, where the system is operative to emulate wired connectivity between two or more robot devices, for instance robot device 1, 202 and robot device N, 204, and a controller 222. The system comprises a tunneling unit 208 that is adapted to be located up-streams of a wireless access network (WAN) 206 that is connected to said two or more robot devices 202, 204 and down-streams of the controller 222. The tunneling unit 208 may be connected to the controller 222, via a local network 220.

It is noted that the tunneling unit 208 is involved in both uplink and downlink traffic.

Uplink frames from the robot devices 202, 204 reach after having passed the WAN 206, a packet inspection module 210, comprised in the tunneling unit 208. This packet inspection module 210 is adapted to receive over the WAN 206, uplink frames from each one of said two or more robot devices, and adapted to further provide a time stamp of the received uplink frames received from each one of said two or more robot devices.

The packet inspection module may be adapted to extract the time stamp from the received uplink data frames by deep packet inspection of said received uplink frames. It is noted that industrial protocols such as ProfiNet, adds a time stamp to it data frames. This time stamp may reflect the time at which the received frame was generated in the respective robot device. It is noted that there is no requirement to synchronize clocks located in robot devices.

Alternatively, the packet inspection module may be adapted to insert a time stamp into received uplink transport frames. This can be useful when receiving frames that are encrypted and for which reason any time stamp would not be available to the packet inspection module. This inserted stamp inserted may thus reflect the time upon reception of the frames by the packet inspection module.

Having passed the packet inspection module in the tunneling unit 208, frames are directed further to a buffering module 212 that is adapted to buffer uplink frames received from the packet inspection module 210. This buffering module may be a synchronized multi-user jitter buffer. The buffering module 212 is thus adapted to buffer incoming frames to eliminate jitter in the uplink direction. The buffering module 212 is also adapted to emit packets with a deterministic periodicity. The buffering module 212 is also adapted to emit packet synchronously, for which reason packets emitted are preferably synchronized. It is noted that the size of the buffering module 212 may be configured via an external module. An optimal jitter buffer size may depend on several parameters, including a setting of industrial protocol, such as update time, on characteristics of wireless connection used, for instance delay and/or jitter, on robot application, such as update type used in the controller, and on the robot device update time.

The buffering module may also be adapted to buffer the uplink frames at least a first duration, where the first duration is based at least on an update time with which the uplink frames are received, and a time spread between the provided time stamps. The update time is typically defined by each robot device and corresponds to the duration between consecutive frames delivered by each one of said two or more robot devices. Frames received from each one of the two or more robot devices may be subjected to various delays and/or jitter while passing the WAN 206, for which reason the a time spread in the time stamp among the received frames may be detected. This spread may thus be taken into account when determining the first time duration during which to buffer uplink frames received from said two or more robot devices.

Frames typically arrive at the buffering module being subjected to delays and/or jitter, for which reason they may arrive with dynamic time intervals between consecutive frames. Frames leaving the buffering module 212 may on the other hand leave at pre-defined time instances. The buffering module 212 may thus comprise a synchronized jitter buffer.

Packets passing the buffering module 212, reach a determining device offset module 214 that is adapted to determine for each one of said two or more robot devices, a relative time offset, based on the provided time stamps for said two or more robot devices. The relative time offset may thus determine an offset between time stamps of different robot devices. Upon further emission or forwarding within the tunneling unit 208, the time difference between time stamps for each pair of robot devices may be calculated and further stored in a storage module 218 within the tunneling unit 208.

After the determining device offset module 214, uplink frames further subjected to an uplink forwarding module 216 that is adapted to forward the buffered uplink frames towards the controller 222 in a pre-defined order. The determining device offset module 214 may be configured to deliver data packets to an upper layer, for instance, the transport layer of the connection between said two or more robot devices and the controller 222. The determining device offset module 214 may be adapted to spread data packets of said uplink frames according to a predefined pattern. For example, data packets may be delivered with a fixed order among said two or more robot devices, using a time gap, between consecutive data packets, of for example 0.1 ms. By forwarding data to the controller 222 in a predefined order, may guarantee that the controller 222 will always receive data frames from different robot devices in a predefined fixed order. A more deterministic interface between said two or more robot devices, and their application, and the controller 222 may hence be provided.

It is noted that the relative time offset as calculated and stored in the storage module 218, may advantageously be used in the downlink in order to ensure that downlink frames are received at said two or more robot devices at substantially simultaneously. Since downlink frames are received by said two or more robot devices at the same time, the wireless connection between the two or more robot devices and the controller, may be regarded to emulate a wired connection over which protocol messages can be communicated with effectively negligible delay and jitter.

It is noted that downlink frames from the controller are directed via the tunneling unit 208.

As illustrated in FIG. 2, the tunneling unit 208 also comprises an insertion module 224. This insertion module 224 is adapted to receive, from the controller 222, said downlink frames to be forwarded towards said two or more robot devices. The insertion module 224 is also adapted to insert, in the downlink frames, the relative time offset that is determined in the uplink, for each one of said two or more robot devices.

It is noted that the downlink frames may be downlink transport frames.

The insertion module 224, as presented in FIG. 2, may be adapted to assign a delivery deadline, comprising the relative time offset, to each downlink transport frame. The delivery deadline may also comprise a robot device specific time.

According to an embodiment of the present disclosure, the insertion module may maintain a time variable that is common for all robot devices and that is dynamically updated. This common time variable may estimate a time difference between clock references measured at up-streams and down-streams ends of a connection between tunneling units, of which tunneling unit 208 is one. Down below a further tunneling unit 228 will be described in more detail. This time difference may thus be an estimate of the time required for a frame to be communicated from one end to the other of said two ends.

The tunneling unit 208 also comprises a downlink forwarding module 226 that is adapted to forward the downlink frames from the insertion module 224 with said inserted relative time offset over the WAN 206 towards each one of said two or more robot devices.

The system may further comprise the further tunneling unit 228, as briefly mentioned above.

The further tunneling unit 228 is adapted to be located down-streams of the WAN 206 and up-streams of the two or more robot devices, as illustrated in FIG. 2. The further tunneling unit 228 comprises a buffering module 230 that is adapted to receive, over the WAN 206, the downlink frames to be forwarded to said two or more robot devices. The buffering module 230 is also adapted to buffer the downlink frames, a time period that is specific to each one of said two or more robot devices, where the time period is at least based on the relative time offset determined for each one of said two or more robot devices.

The further tunneling unit 228 also comprises a downlink forwarding module 232 that is adapted to forward the buffered downlink frames to said two or more robot devices. Forwarding, or delivering, the buffered downlink frames is performed at an expiration of a delivery deadline, such that the buffered downlink frames arrive at each one of said two or more robot devices at the same time. The delivery deadline is determined to be specific for each robot device. Frames that may be directed towards a certain robot device and which are received by the buffering module 230 at an early stage, will have to be buffered a longer time, as compared to frames being received at a later stage, in order to forward, or deliver, these frames such that they are received at the robot devices simultaneously. It is again pointed out the clocks in each robot are typically not synchronized, for which reason the delivery deadline is preferably related to the time of each robot device. This is accomplished by using the relative time offset as stored in the storage module 218.

The delivery deadline may be calculated in various similar ways. As described in relation to the uplink direction, delay and/or jitter caused when communicating frames over the WAN 206, have to be taken into account also in the downlink direction.

According to one embodiment of the present disclosure, the delivery deadline when determined in the insertion module 224, may be a sum of a current time as determined on the upstreams side of the Wan 206, and a robot device specific time offset. In this way, the delivery deadline can be specified in the time of each robot device itself.

The robot device specific time offset may have two components, of which one is an estimated delay difference between a clock in the tunneling unit 208, and a reference device clock. This estimated time difference may be regularly updated based on an average queue length feedback from said two or more robot devices. The second component may be an offset of each robot device to the clock of the reference device.

The downlink forwarding module 232 is adapted to forward the frames to each respective robot device, as they are provided by the buffering module 230.

It is reiterated that the buffering module is adapted to emit frames or packets when reaching the deadline. The buffering module may also be adapted to measure an average waiting time in the buffering module 230 and report it to the tunneling unit 208.

It is noted that an optimal size of a jitter buffer of the buffering module 230 in the further tunneling unit 228 may depend on settings of the industrial protocol being utilized, on robot application, i.e. an update type used by the controller 222, and on an update time used by said two or more robot devices. The jitter buffer size may implicitly be set by a queue length feedback provided by the said robot devices. Each robot device may further be adapted to have a target jitter buffer length, from which it reports jitter buffer lengths relative to said target jitter buffer length.

The present disclosure thus provides an efficient and cost effective technology for seamless transition from wired to wireless communication technologies.

The presented actions and steps as presented herein ensure a delivery of industrial protocols over a wireless link such that legacy devices and protocols do not have to be changed or replaced.

The proposed disclosure comprises downlink and uplink parts and may have entities at both ends of the wireless connection, or tunnel. In the uplink direction the disclosure provides a time-stamp of each data frame. In the buffering module 212 a synchronized jitter buffer may be applied. Packets are preferably delivered to the controller 222 in a predefined order or pattern.

Moreover, in the downlink direction, this disclosure may also determine time offsets between the controller 222 and each robot device clock, to be applied in the deadline buffering performed within the buffering module 230.

Figure 3:
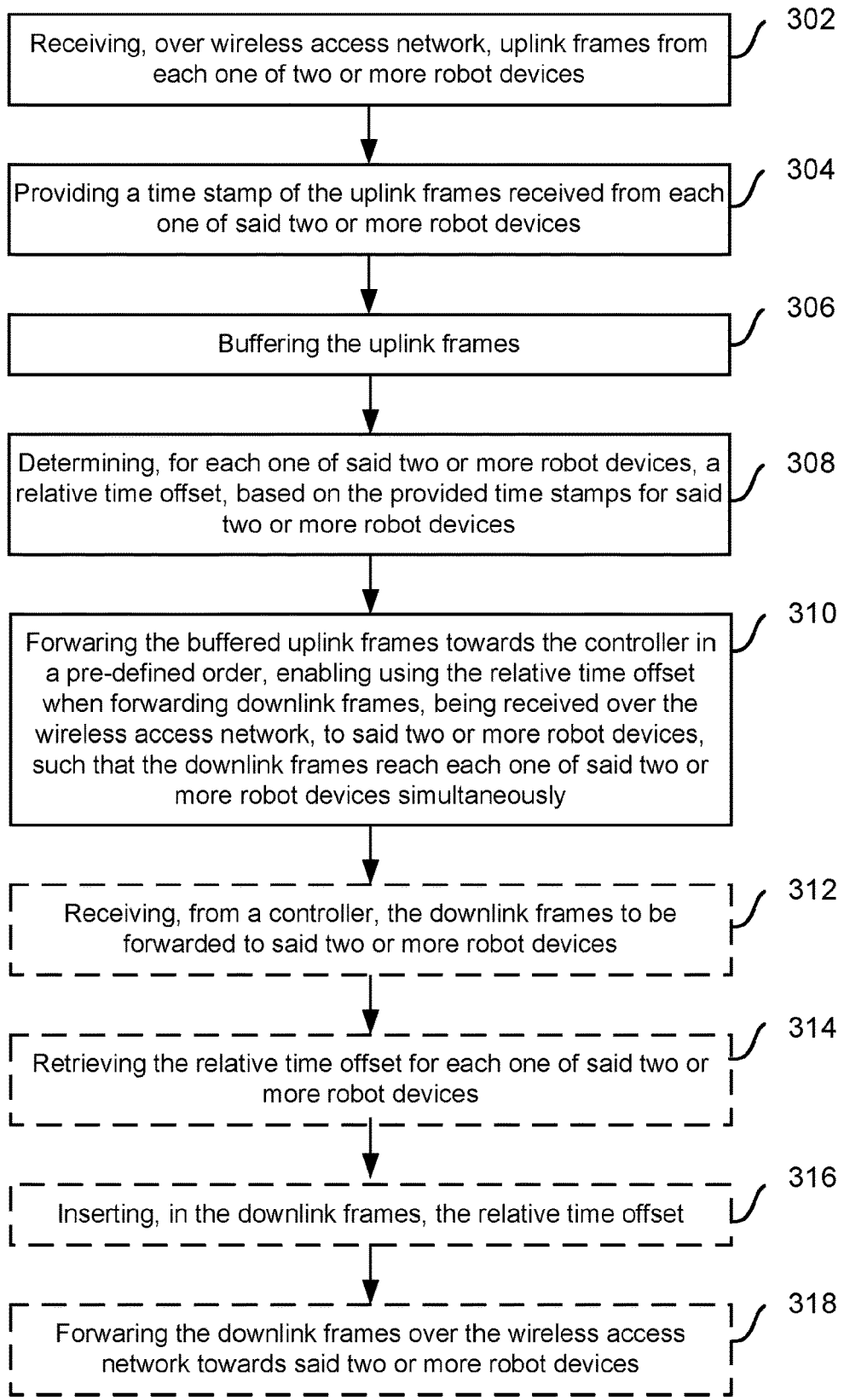
FIGS. 3 and 4 present flow charts of actions of methods according to embodiments of the present disclosure.

FIG. 3 presents a flow chart of actions of a method for emulating wired connectivity between two or more robot devices and a controller. This method is performed in a tunneling unit 208 that is located up-streams of a wireless access network and down-streams of a controller. The method comprises the following actions:

Action 302: Receiving, over the wireless access network, uplink frames from each one of said two or more robot devices.

Action 304: Providing a time stamp of the uplink frames received from each one of said two or more robot devices.

Action 304 may further comprise extracting the time stamp from uplink frames by deep packet inspection of uplink frames being received.

Action 304 may alternatively comprise providing the time stamp comprises inserting a time stamp into said uplink frames.

Action 306: Buffering the uplink frames.

Action 306 may comprise buffering the uplink frames at least a first duration, where the first duration is based at least on an update time with which the uplink frames are received, and a time spread between the provided time stamps.

Action 306 may comprise buffering the uplink frames at least a first duration, where the first duration is based at least on an update time with which the uplink frames are received, and a time spread between the provided time stamps.

Action 308: Determining, for each one of said two or more robot devices, a relative time offset, based on the provided time stamps for said two or more robot devices. The method also comprises:

Action 310: Forwarding the buffered uplink frames towards the controller in a pre-defined order.

The actions 302-310 enable using the relative time offset when forwarding downlink frames, being received over the wireless access network, to said two or more robot devices, such the that the downlink frames reach each one of two or more robot devices simultaneously.

Action 310 of forwarding the buffered uplink frames may comprise synchronously forwarding said buffered uplink frames towards the controller. The buffering may thus simultaneously forward buffered uplink frames originated from different robot devices.

The flowchart of actions may also comprise storing 309 the relative time offset for each one of said two or more robot devices.

The flowchart of actions may further comprise the followings actions, as the controller may forward downlink frames towards the two or more robot devices as a response to the uplink frames as received from said two or more robot devices:

Action 312: Receiving, from the controller, the downlink frames to be forwarded to said two or more robot devices.

Action 314: Retrieving the relative time offset for each one of said two or more robot devices. Retrieving the relative time offset may be performed from the storage module 218.

Action 316: Inserting, in the downlink frames, the relative time offset. This action may comprise inserting the relative time offset, as retrieved from the storage module 218.

Action 318: Forwarding the downlink frames, comprising the relative time offset, over the wireless access network, towards said two or more robot devices.

Figure 4:
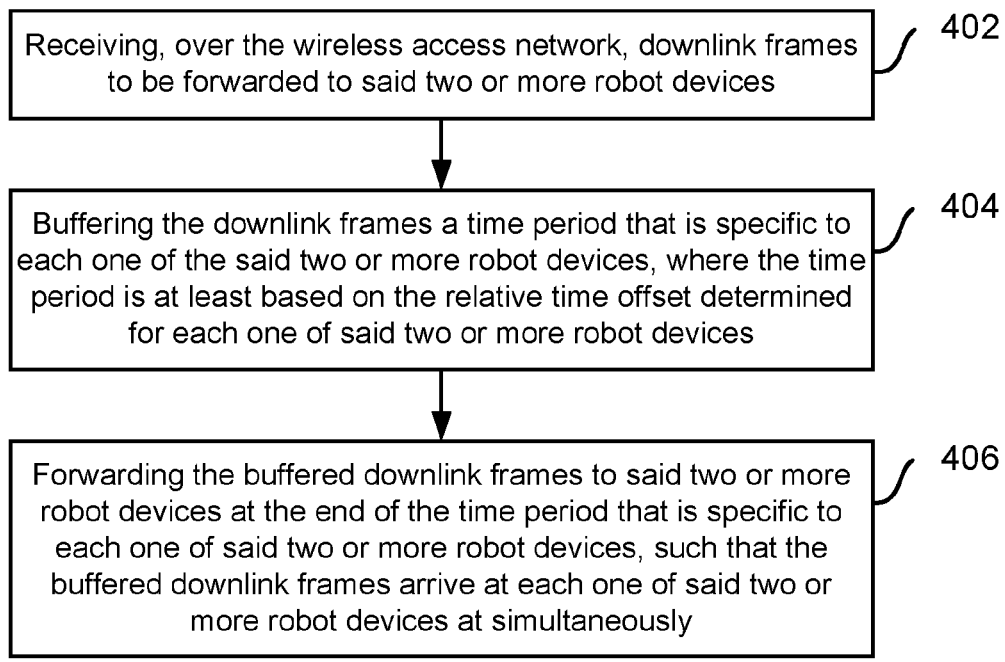

FIG. 4 presents a flow chart of actions of a method of emulating wired connectivity between two or more robot devices and a controller, according to embodiments of the present disclosure. This is achieved by providing deterministic delivery of data over a wireless access network between the controller and said two or more robot devices. The method is performed in a system of emulating wired connectivity between two or more robot devices and a controller. The method as performed in the system comprises the actions as described in connection with FIG. 3. This method also comprises the following actions:

Action 402: Receiving, over the wireless access network, the downlink frames to be forwarded to said two or more robot devices.

Action 404: Buffering the downlink frames, a time period that is specific to each one of said two or more robot devices, where the time period is at least based on the relative time offset determined for each one of said two or more robot devices.

Action 406: Forwarding the buffered downlink frames to said two or more robot devices at the end of the time period that is specific to each one of said two or more robot devices, such that the buffered downlink frames arrive at each one of said two or more robot devices simultaneously.

The flowchart of actions may further comprise determining 403 the time period, and wherein action 404 of buffering the downlink frames may also comprise measuring a duration of the buffering and ending said buffering when the duration of the buffering has reached the determined time period.

Action 406 of forwarding the buffered downlink frames, may comprise synchronously forwarding said the buffered downlink frames to said two or more robot devices.

Figure 5:
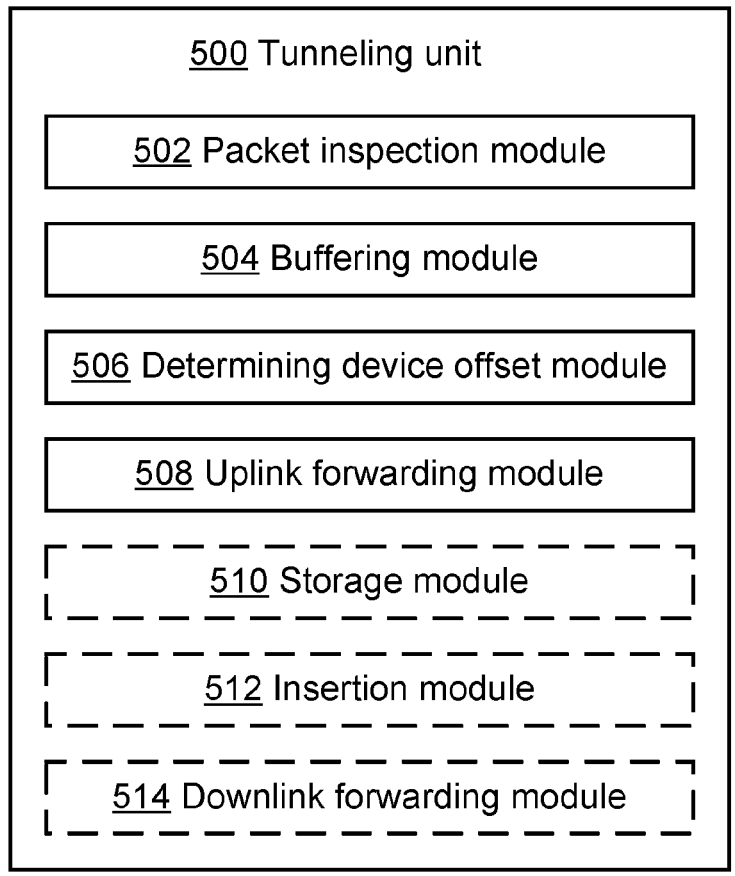
FIGS. 5 and 6 present a tunneling unit, according to embodiments of this disclosure.

FIG. 5 presents a tunneling unit 500, according to embodiments of this disclosure. The tunneling unit 500 is operative to emulate wired connectivity between two or more robot devices and a controller. The tunneling unit 500 is adapted to be located up-streams of wireless access network and down-streams of a controller. The tunneling unit 500 comprises:
- a packet inspecting module 502 that is adapted to receive, over the wireless access network, uplink frames from each one of said two or more robot devices. This packet inspection module is also adapted to provide a time stamp of the uplink frames received from each one of said two or more robot devices;
- a buffering module 504 that is adapted to buffer the uplink frames;
- a determining device offset module 506 that is adapted to determine for each one of said two or more robot devices, a relative time offset, based on the provided time stamps for said two or more robot devices; and
- an uplink forwarding module 508 that is adapted to forward the buffered uplink frames towards the controller in a pre-defined order, enabling a further tunneling unit 74, 84 to forward downlink frames using the relative time offset, to said two or more robot devices, such the that the downlink frames reach each one of two or more robot devices simultaneously.

The tunneling unit 500 as presented in FIG. 5 may further comprise:
- a storage module 510 that is adapted to store the relative time offset for each one of said two or more robot devices;
- an insertion module 512 that is adapted to receive, from the controller, downlink frames to be forwarded to said two or more robot devices. This insertion module is also adapted to insert, in the downlink frames, the relative time offset for each one of said two or more robot devices;
- a downlink forwarding module 514 that is adapted to forward the downlink frames with said inserted relative time offset over the wireless access network, towards each one of said two or more robot devices.

Figure 6:
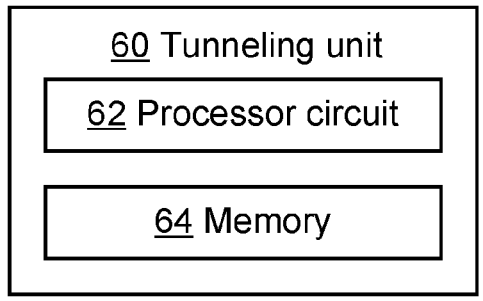

FIG. 6 presents a tunneling unit 60, according to embodiments of this disclosure. The tunneling unit 60 is operative to emulate wired connectivity between two or more robot devices and a controller. The tunneling unit 60 is adapted to be located up-streams of wireless access network and down-streams of a controller. The tunneling unit 60 comprises:
- a processor circuit 62; and
- a memory 64 that has instructions executable by the processor circuit 62, wherein said processor circuit 62 when executing said instructions is configured to:
  - receive, over the wireless access network, uplink frames from each one of said two or more robot devices,
  - provide a time stamp of the uplink frames received from each one of said two or more robot devices,
  - buffer the uplink frames,
  - determine, for each one of said two or more robot devices, a relative time offset, based on the provided time stamps for said two or more robot devices, and
  - forward the buffered uplink frames towards the controller in a pre-defined order;
- enabling a further tunneling unit 60 to forward downlink frames using the relative time offset, to said two or more robot devices, such the that the downlink frames reach each one of two or more robot devices simultaneously.

The memory 64 of the tunneling unit 60 may also have instructions executable by the processor circuit 62, wherein said processor circuit 62 when executing said instructions is configured to:
- receive, from the controller, downlink frames to be forwarded to said two or more robot devices;
- retrieve the relative time offset for each one of said two or more robot devices;
- insert in the downlink frames, the relative time offset; and
- forward the downlink frames, over the wireless access network, towards said two or more robot devices.

The present disclosure also comprises a tunneling unit 500, 60, which is operative to emulate wired connectivity between two or more robot devices and a controller. The tunneling unit 500, 60 is adapted to be located up-streams of wireless access network and down-streams of a controller. The tunneling unit 500, 60 is adapted to receive, over the wireless access network, uplink frames from each one of said two or more robot devices. The tunneling unit is also adapted to provide a time stamp of the uplink frames received from each one of said two or more robot devices. The tunneling unit is also adapted to buffer the uplink frames. The tunneling unit is also adapted to determine, for each one of said two or more robot devices, a relative time offset, based on the provided time stamps for said two or more robot devices. In addition, the tunneling unit is adapted to forward the buffered uplink frames towards the controller in a pre-defined order, enabling a further tunneling unit 228 to forward downlink frames using the relative time offset, to said two or more robot devices, such the that the downlink frames reach each one of two or more robot devices simultaneously.

Figure 7:
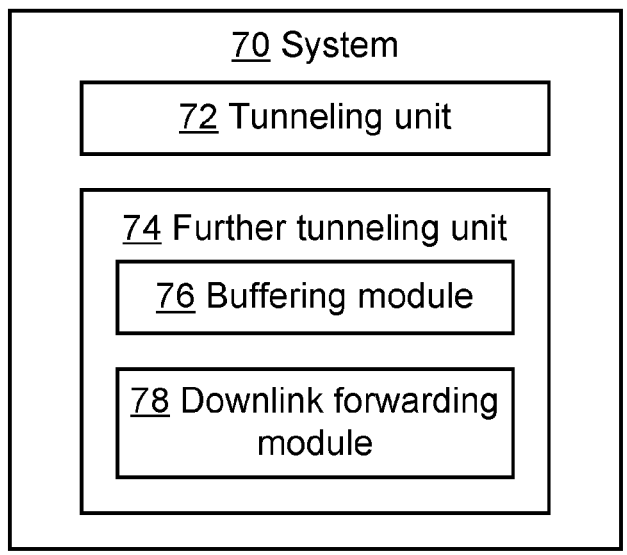
FIGS. 7 and 8 schematically present a system, according to embodiments of the present disclosure.

FIG. 7 schematically presents a system 70, according to embodiments of the present disclosure. The system 70 is operative to emulate wired connectivity between two or more robot devices and a controller. The system comprises a tunneling unit 500, 60, 72 as described in connection with FIG. 5, where the tunneling unit 72 is adapted to be located up-streams of a wireless access network and down-streams of a controller. The system also comprises a further tunneling unit 74 that is adapted to be located down-streams of the wireless access network and up-streams of the two or more robot devices. The further tunneling unit 74 comprises:
- a buffering module 76 that is adapted to receive, over the wireless access network, downlink frames to be forwarded to said two or more robot devices. This buffering module 76 is also adapted to buffer the downlink frames, a time period that is specific to each one of said two or more robot devices, where the time period is at least based on the relative time offset determined for each one of said two or more robot devices; and
- a downlink forwarding module 78 that is adapted to forward the buffered downlink frames to said two or more robot devices, such that the buffered downlink frames arrive at each one of said two or more robot devices simultaneously.

Figure 8:
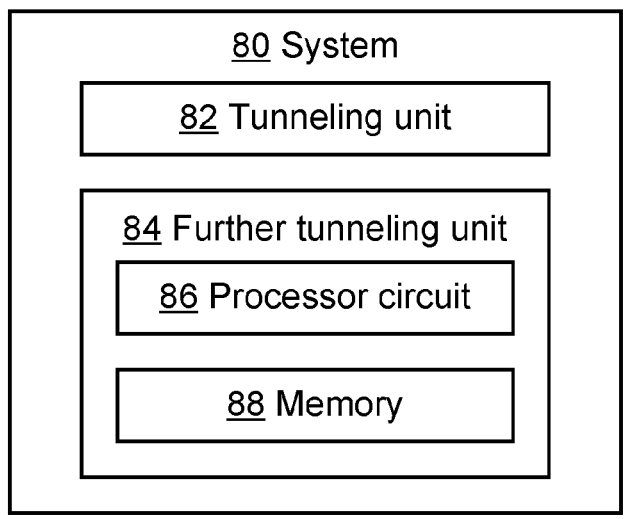

FIG. 8 schematically presents a system 80, according to embodiments of the present disclosure. The system 80 is operative to emulate wired connectivity between two or more robot devices and a controller. The system comprises a tunneling unit 500, 60, 72, 82 as described in connection with FIG. 6. The tunneling unit 500, 60, 72, 82 is adapted to be located up-streams of a wireless access network and down-streams of the controller. The system also comprises a further tunneling unit 74, 84 that is adapted to be located down-streams of the wireless access network and up-streams of the two or more robot devices. The further tunneling unit 84 comprises:
- a processor circuit 86; and
- a memory 88 that has instructions executable by the processor circuit 86, wherein said processor circuit 86 when executing said instructions is configured to:
  receive, over the wireless access network, downlink frames to be forwarded to said two or more robot devices,
  buffer the downlink frames, a time period that is specific to each one of said two or more robot devices, where the time period is at least based on the relative time offset determined for each one of said two or more robot devices, and
  forward the buffered downlink frames to said two or more robot devices, such that the buffered downlink frames arrive at each one of said two or more robot devices simultaneously.

The present disclosure also comprises a computer program for emulating wired connectivity between two or more robot devices and a controller. The computer program comprises instructions which, when executed on at least one processor, cause the at least one processor to carry out the any one of the actions as mentioned above and/or presented in any FIG. 3 or 4.

The present disclosure also comprises a computer-readable storage medium having thereon the computer program as above.

Examples and/or embodiments of the present disclosure have one or more of the following advantages:

A cost effective and efficient technology is provided for the transition from wired to wireless technologies in industry environments.

It is an advantage that data frames are handled such that delay and/or jitter, as introduced over the wireless access network, will have effectively no influence of data frame communication.

Existing legacy protocols and industry devices, such as robot devices, can remain unchanged. There is thus no need for replacing the devices.

Data frame transmission is more deterministic in uplink and downlink directions.

This disclosure has the advantage that data frames of sensors, measuring units, or the like, can be delivered to a controller in a pre-defined, and hence deterministic, order.

It is advantageous that a more deterministic transport service is provided for automation application in industry.

Abbreviations 3D three-dimensional
4G $4^{th}$ generation wireless systems
5G $5^{th}$ generation wireless systems
HARQ hybrid automated repeat request
HTTP hypertext transfer protocol
IaaS infrastructure as a service
ms millisecond
PaaS platform as a service
PLC programmable logic controller
ProfiNet process field network
RAaaS robotics and automation as a service
RLC AM radio link control acknowledged mode
SaaS software as a service
SPI shallow packet inspection
TSN time-sensitive networking
UTP unshielded twisted pair
WAN wireless access network

The invention claimed is:

1. A method of emulating wired connectivity between two or more robot devices and a controller, the method comprising a tunneling unit located up-stream of a wireless access network and down-stream of a controller:
   receiving, over the wireless access network, uplink frames from each one of the two or more robot devices;
   providing a time stamp of the uplink frames received from each one of the two or more robot devices;
   buffering the uplink frames;
   determining, for each one of the two or more robot devices, a relative time offset, based on the provided time stamps for the two or more robot devices; and
   forwarding the buffered uplink frames towards the controller in a predefined order;
   thereby enabling using the relative time offset when forwarding downlink frames, being received over the wireless access network, to the two or more robot devices, such the that the downlink frames reach each one of two or more robot devices simultaneously.

2. The method of claim 1, wherein the forwarding the buffered uplink frames comprises synchronously forwarding the buffered uplink frames towards the controller.

3. The method of claim 1, wherein the buffering the uplink frames comprises buffering the uplink frames at least a first duration, where the first duration is based at least on an update time with which the uplink frames are received, and a time spread between the provided time stamps.

4. The method of claim 1, further comprising storing the relative time offset for each one of the two or more robot devices.

5. The method of claim 1, wherein the providing the time stamp comprises extracting the time stamp from uplink frames by deep packet inspection of uplink frames being received.

6. The method of claim 1, wherein the providing the time stamp comprises inserting a time stamp into the uplink frames.

7. The method of claim 1, further comprising:
receiving, from the controller, downlink frames to be forwarded to the two or more robot devices;
retrieving the relative time offset for each one of the two or more robot devices;
inserting the relative time offset in the downlink frames; and
forwarding the downlink frames, over the wireless access network, towards the two or more robot devices.

8. A method of emulating wired connectivity between two or more robot devices and a controller, by providing deterministic delivery of data over a wireless access network between the controller and the two or more robot devices; the method performed in a system; the system comprising a tunneling unit located upstream of a wireless access network and downstream of a controller; the method comprising:
the tunneling unit:
receiving, over the wireless access network, uplink frames from each one of the two or more robot devices;
providing a time stamp of the uplink frames received from each one of the two or more robot devices;
buffering the uplink frames;
determining, for each one of the two or more robot devices, a relative time offset, based on the provided time stamps for the two or more robot devices; and
forwarding the buffered uplink frames towards the controller in a predefined order;
receiving, from the controller and over the wireless access network, downlink frames to be forwarded to the two or more robot devices;
retrieving the relative time offset for each one of the two or more robot devices;
inserting the relative time offset in the downlink frames; and
the method further comprising:
buffering the downlink frames a time period that is specific to each one of the two or more robot devices, where the time period is at least based on the relative time offset determined for each one of the two or more robot devices; and
forwarding the buffered downlink frames, over the wireless access network, towards the two or more robot devices at the end of the time period that is specific to each one of the two or more robot devices, such that the buffered downlink frames arrive at each one of the two or more robot devices simultaneously.

9. The method of claim 8:
further comprising determining the time period; and
wherein the buffering the downlink frames comprises measuring a duration of the buffering and ending the buffering when the duration of the buffering has reached the determined time period.

10. The method of claim 8, wherein the forwarding the buffered downlink frames comprises synchronously forwarding the buffered downlink frames to the two or more robot devices.

11. A tunneling unit operative to emulate wired connectivity between two or more robot devices and a controller, the tunneling unit being located upstream of a wireless access network and downstream of a controller and comprising:
processing circuitry; and
memory containing instructions executable by the processing circuitry whereby the tunneling unit is operative to:
receive, over the wireless access network, uplink frames from each one of the two or more robot devices;
provide a time stamp of the uplink frames received from each one of the two or more robot devices;
buffer the uplink frames;
determine, for each one of the two or more robot devices, a relative time offset, based on the provided time stamps for the two or more robot devices; and
forward the buffered uplink frames towards the controller in a predefined order;
thereby enabling a further tunneling unit to forward downlink frames using the relative time offset, to the two or more robot devices, such the that the downlink frames reach each one of two or more robot devices simultaneously.

12. The tunneling unit of claim 11, wherein the instructions are such that the tunneling unit is operative to:
store the relative time offset for each one of the two or more robot devices;
receive, from the controller, downlink frames to be forwarded to the two or more robot devices;
insert, in the downlink frames, the relative time offset for each one of the two or more robot devices; and
forward the downlink frames with the inserted relative time offset over the wireless access network towards each one of the two or more robot devices.

13. The tunneling unit of claim 11, wherein the instructions are such that the tunneling unit is operative to forward the buffered uplink frames synchronously towards the controller.

14. The tunneling unit of claim 11, wherein the instructions are such that the tunneling unit is operative to buffer the uplink frames at least a first duration, where the first duration is based at least on an update time with which the uplink frames are received, and a time spread between the provided time stamps.

15. The tunneling unit of claim 11, wherein the instructions are such that the tunneling unit is operative to store the relative time offset for each one of the two or more robot devices.

16. The tunneling unit of claim 11, wherein the instructions are such that the tunneling unit is operative to provide the time stamp by extracting the time stamp from uplink frames by deep packet inspection of uplink frames being received.

17. The tunneling unit of claim 11, wherein the instructions are such that the tunneling unit is operative to provide the time stamp by inserting the time stamp into the uplink frames.

18. A system operative to emulate wired connectivity between two or more robot devices and a controller, the system comprising:
a tunneling unit located upstream of a wireless access network and downstream of a controller, wherein the tunneling unit comprises:

first processing circuitry; and
first memory containing instructions executable by the first processing circuitry whereby the tunneling unit is operative to:
receive, over the wireless access network, uplink frames from each one of the two or more robot devices;
provide a time stamp of the uplink frames received from each one of the two or more robot devices;
buffer the uplink frames;
determine, for each one of the two or more robot devices, a relative time offset, based on the provided time stamps for the two or more robot devices; and
forward the buffered uplink frames towards the controller in a predefined order;
thereby enabling a further tunneling unit to forward downlink frames using the relative time offset, to the two or more robot devices, such the that the downlink frames reach each one of two or more robot devices simultaneously;

a further tunneling unit located downstream of the wireless access network and upstream of the two or more robot devices, the further tunneling unit comprising:
second processing circuitry; and
second memory containing instructions executable by the second processing circuitry whereby the further tunneling unit is operative to:
receive, over the wireless access network, downlink frames to be forwarded to the two or more robot devices;
buffer the downlink frames a time period that is specific to each one of the two or more robot devices, where the time period is at least based on the relative time offset determined for each one of the two or more robot devices; and
forward the buffered downlink frames to the two or more robot devices, such that the buffered downlink frames arrive at each one of the two or more robot devices simultaneously.

\* \* \* \* \*